United States Patent [19]

Zimbrek

[11] Patent Number: 5,426,696
[45] Date of Patent: Jun. 20, 1995

[54] METHOD OF IMPROVING RECEIVER SENSITIVITY AND SPEECH IMMUNITY WITH DTMF-RECEPTION

[75] Inventor: Slaven Zimbrek, Sundbyberg, Sweden

[73] Assignee: Telefonaktiebolaget LM Ericsson, Stockholm, Sweden

[21] Appl. No.: 84,714

[22] Filed: Jul. 1, 1993

[30] Foreign Application Priority Data

Jul. 3, 1992 [SE] Sweden .................... 9202065

[51] Int. Cl.$^6$ .................................. H04M 3/22
[52] U.S. Cl. ...................... 379/386; 379/282; 379/283; 379/290
[58] Field of Search ............... 379/386, 290, 282, 283; 328/138, 139, 351

[56] References Cited

U.S. PATENT DOCUMENTS

| | | | |
|---|---|---|---|
| 3,927,259 | 12/1975 | Brown | 379/93 |
| 3,990,006 | 11/1976 | Zebo | 324/76.57 |
| 4,045,620 | 8/1977 | Westbrook | 379/290 |
| 4,356,348 | 10/1982 | Smith | 379/34 |
| 4,386,239 | 5/1983 | Chien | 379/386 |
| 4,439,639 | 3/1984 | Munter | 379/386 |
| 4,599,495 | 7/1986 | Richards | 379/351 |
| 4,675,898 | 6/1987 | Bellenger | 379/97 |
| 4,853,958 | 8/1989 | Rabipour et al. | 379/386 |
| 5,070,526 | 12/1991 | Richmond et al. | 379/372 |

FOREIGN PATENT DOCUMENTS

| | | |
|---|---|---|
| 1364773 | 8/1974 | United Kingdom . |
| 2185170 | 7/1987 | United Kingdom . |
| 87/07799 | 12/1987 | . |

Primary Examiner—James L. Dwyer
Assistant Examiner—Jacques M. Saint-Surin
Attorney, Agent, or Firm—Burns, Doane, Swecker & Mathis

[57] ABSTRACT

A method of improving the sensitivity and speech immunity of a receiver in conjunction with DTMF-reception is disclosed. The number of zero-crossings of the input signal are counted during one of a number of measuring intervals in real time at frequencies which occur in the low frequency group and the high frequency group of a DTMF-signal. At the end of each of the measuring intervals, the number of zero-crossings in a current measuring interval is compared for each frequency group, with a corresponding number of zero crossing in a number of nearest preceding measuring intervals, and the magnitude of any difference is established. The input signal is treated as a DTMF-signal when the difference is at most equal to a permitted limit value.

6 Claims, 3 Drawing Sheets

METHOD OF IMPROVING RECEIVER SENSITIVITY AND SPEECH IMMUNITY WITH DTMF-RECEPTION

TECHNICAL FIELD

The present invention relates to a method of improving receiver sensitivity and speech immunity in conjunction with DTMF-reception.

Keypad telephones use so-called DTMF-signals (Dual Tone Multi-Frequency) to transmit numbers. With each key, there is generated a low and a high frequency signal corresponding to the row and the column in which a key is located on the keypad. The resultant DTMF-signal is a composite signal which consists in a high frequency tone and a low frequency tone. Those frequencies used at present are 697, 770, 852 and 941 Hz for the low frequency group and 1209, 1336, 1477 and 1633 Hz for the high frequency group.

BACKGROUND ART

The following description of the background art is based on DTMF-receivers that include a digital signal processor. However, the present invention, as later described, can also be applied with analog DTMF-receivers, with suitable modifications.

A program, the so-called DTMF-program (algorithm), is provided for measuring and examining the input signal to a DTMF-receiver. This program may be divided, for instance, into 6 ms long measuring intervals, of which each comprises 24 sub-intervals. Each sub-interval is 250 $\mu$s long (sub-sampling). At the end of each 6 ms measuring interval, the accumulated energies of the low frequency group and the high frequency group and of each DTMF-frequency are ready for analysis. The program is comprised of two parts.

The first part is carried out in real time, namely once every 250 $\mu$s, and includes input sample filtration, energy accumulation and counting zero-crossings.

The other part of the DTMF-program is carried out at the end of each 6 ms measuring interval (during the last 250 $\mu$s sub-interval) and includes analyzing the filtration result, validation and decoding of the DTMF-signal and time supervision.

These two parts of the program will be described individually in more detail below.

In the first part of the program, of input samples is effected with the aid of a classic filter-bank method, which provides the spectral energy of the eight DTMF-frequencies by digital filtration. The incoming PCM-signal is first divided into a low frequency band and a high frequency band, for the high and the low frequency groups, so as to enable the latter to be processed separately. The frequency band separation is effected by two IIR elliptical cascade filters of the band-pass type (sixth order for low bands and eighth order for high bands) constructed by bilinear transforms. The output signals from each band-pass filter are then processed in four band-pass filters (second order IIR-resonators), the pass bands of which correspond to the eight DTMF-frequencies. The end result of the first program part (at the end of each 6 ms measuring interval) is the spectral energies of the low frequency band and the high frequency band and of eight DTMF-frequency bands.

As before mentioned, the second part of the program is carried out at the end of the 6 ms measuring interval. Analysis is effected on the basis of the result obtained from the first part of the program (accumulated energies of low and high frequency bands and of each DTMF-frequency), and leads to decoding of the DTMF-number.

In effect, a number of comparisons and checks, or controls, are carried out in this second part of the program, and the average energy of each band is calculated. This series of comparisons and checks ensures that the tones lie within specified limits and that a valid tone is new data that must be processed. The checks are carried out in the following order:

Signal level check
Swing check

The swing is the difference between the average energy and the current energy of the signal (the current energy is energy that is accumulated during the preceding 6 ms measuring interval). In effect, the swing shows the level of signal stability. DTMF-signals normally have only a small swing, whereas speech normally has a large swing. Swing check is therefore used to improve speech immunity. The band-pass energies of the average values are calculated in accordance with appropriate formulae, when the signal is sufficiently strong and the swing value lies within prescribed limits.

Twist is the difference, in decibels, between the amplitude of the strongest keypad row tone and the amplitude of the strongest keypad column tone. According to CEPT, the maximum permitted twist is $\pm 6$ dB.

During the DTMF-frequency validation process, the program compares the energy of each frequency resonator in each group (band) with the average energy of the whole group (band). In order for a DTMF-signal to be considered to exist, it is necessary, generally, for the strongest tone in each group to lie above a given threshold, while all other tones in the group must lie beneath a given lowest noise level. Each DTMF-frequency has its own threshold and noise level.

Time supervision ensures that the DTMF-number will only be detected when all specified time requirements (tone length, pause length, tone interruption, etc.) are fulfilled.

Typical problems encountered with DTMF-receivers relate to requirements concerning speech immunity and sensitivity. The more sensitive the receiver, the worse its speech immunity, in general. When constructing a DTMF-receiver, endeavours are made generally to find an optimal compromise between these two requirements, i.e., a compromise which will provide both good sensitivity and speech immunity at one and the same time.

A number of other methods of improving the speech immunity of a receiver are known to the art. The most common of these methods include:

The use of window techniques;
Analysis of second harmonics;
Swing check.

The window technique is normally used when evaluating DFT and other algorithms of this type (Görtzel algorithm).

The analysis of second harmonics includes calculating the energy at the double tone frequency and introducing this value in the DTMF-tone validation checks. Application of this technique is more or less essential when using DFT (Görtzel algorithm), because relatively little calculation work is required to calculate the energy of the second harmonic. However, this calculation of the second harmonic requires the use of eight additional filters when using the filter-bank method according to the above.

Swing check is the usual technique applied when using the filter-bank method. Swing is in effect a measurement of swings, or oscillations, in the level of the input signal. The level of the DTMF-signal is normally more or less constant, whereas said level is quite unstable with regard to speech. An investigation with the aid of swing check examination will therefore ensure that the program will not confuse speech with DTMF-signal, or at least not too often.

Nevertheless, the DTMF-signal may have marked swings in environments of very strong noise or in the presence of strong interference frequencies. In such instances, the swing check is sometimes unable to solve the speech immunity problem. The speech immunity will decrease considerably when the maximum swing tolerance increases. On the other hand, if this increase does not occur, the receiver sensitivity will worsen and detection becomes poor.

WO-A1-87/07799 describes a telephone line supervisory system which includes a circuit for detecting voice signals in the presence of "supervisory signals" on a number of telephone lines. The teachings of this publication are based on the teachings of U.S. Pat. No. 4,356,348, which is said to determine the most usual time interval between zero-crossings of an input signal and compares this interval with subsequent time intervals with the intention of classifying the input signal, with regard to whether the signal is periodic or not.

According to WO-A1-87/07799, the system includes zero crossing detectors. Short samples (10 ms) are taken from the incoming signal and also count values of the waveforms from which the signal is composed. A voice generates more events than tones for a given sample, because of that a voice sound will exhibit more complex waveforms than tones. In order to avoid erroneous interpretation of noise, two or three samples are taken in sequence in order to distinguish between silence, tones and voice.

U.S. Pat. No. 4,439,639 describes a digital tone detector for a plurality of "call progress tones", voice signals or silence. There is produced a signal which corresponds to the level of the input signal, zero-crossings are counted and an envelope detector produces a signal representative of the envelope frequency. From this, a logic circuit produces an output signal which represents the identity of the input signal.

U.S. Pat. No. 3,927,259 teaches a signal identification system for distinguishing between noise and modulated data. The system utilizes zero crossing detection, among other things.

U.S. Pat. No. 4,675,898 discloses that it is known in DTMF to apply zero crossing detection for detecting each individual tone frequency. The publication does not deal with the problems surrounding speech immunity.

U.S. Pat. No. 4,599,495 describes an apparatus for detecting tones in conjunction with multi-frequency signalling processes. "Talk-off immunity" is discussed and the intention is to indicate the presence of signal tones in an input channel where noise occurs.

Several filters are used, and the use of first and second thresholds is mentioned.

U.S. Pat. No. 4,386,239 describes a multi-frequency tone detector, and the intention is to be able to distinguish between tones and signals that derive from noise and voices. The patent mentions comparator thresholds, and two comparators are used.

U.S. Pat. No. 5,070,526 relates to a signal analysis system for determining whether a telephone signal consists of a voice or a "call progress signal". This system utilizes a computer and analyzes segments of the digital representation of the signal to determine whether or not the signal has uniform frequency components which are repeated at regular intervals. No mention is made of the recognition of a tolerated single noise tone.

DISCLOSURE OF THE INVENTION

One object of the present invention is to solve the problem of receiver sensitivity and speech immunity in heavy noise environments and/or in the presence of strong interference frequencies.

According to one aspect of the invention, this object has been achieved by counting during each of a number of measuring intervals in real time the number of zero-crossings of the input signal at frequencies which occur in the low frequency group and the high frequency group of a DTMF-signal;

comparing at the end of each of the measuring intervals the number of zero-crossings for each frequency group in a current measuring interval with the number of zero-crossings in a number of immediately preceding measuring intervals, and establishing the magnitude of any difference therebetween; and treating the input signal as a DTMF-signal when the difference is at most equal to a permitted limit value.

Zero-crossings are counted conventionally to establish the frequency of an input signal or to distinguish between a voice signal and a signal concerning a call in process in different types of automated "voice processing apparatus", although zero crossing counts have not been used hitherto to improve the speech immunity in DTMF-receivers. However, this first aspect of the invention nevertheless uses a zero crossing count.

Preferably, one (1) is used as the permitted limit value and the comparison of the number of zero-crossings is effected during at least two mutually sequential measuring intervals.

According to a second aspect of the invention, the aforesaid object is achieved by measuring in real time in each of the DTMF-frequency group bands during each of a number of measuring intervals an energy parameter which is representative of the tone energy of an input signal;.

determining the average value of such totally measured parameters over the measuring interval from the beginning of the signal concerned during the end of each measuring interval;

determining the difference between each of the relevant energy parameters in the two bands and the average value established parameter;

determining at least three threshold values for this difference, namely a normal value below which a DTMF-signal is considered to exist, at least one greater-than-normal value, and at least one smaller-than-normal value;

ascertaining whether or not the difference in one of the bands lies above the normal value, and if the difference does lie above said normal value, ascertaining whether or not the difference in question also lies above the greater-than-normal value; and comparing the difference in the second band with the smaller-than-normal value in order to ascertain whether or not the difference lies beneath said value, in which case a DTMF-signal is considered to exist.

According to one preferred and highly advantageous embodiment, there are used two greater-than-normal values and a DTMF-signal is considered to exist when one of the following conditions is fulfilled:

(a) The current energy of the two bands lies beneath the smaller-or-normal value and/or the normal value;

(b) The current energy of a band exceeds the normal value but not the lower of the greater-than-normal values, and the current energy of the other band is lower than the smaller-than-normal value and/or the normal value; and (c) The current energy of a band exceeds the lower but not the higher of the greater-than-normal values, the current energy of the other band is lower than the smaller-than-normal value and no earlier energy of said other band has exceeded the lower greater-than-normal value, this earlier energy being calculated from the 6 ms interval in which the DTMF-signal concerned is detected for the first time.

According to a third aspect of the invention, the aforesaid object is realized by noting an interference frequency which is encountered for the first time during one of a number of measuring intervals when decoding a DTMF-signal, and tolerating an interference tone when the same tone is encountered in a following measuring interval.

BRIEF DESCRIPTION OF THE DRAWINGS

The invention will now be described in more detail with reference to the accompanying drawings, in which.

BEST MODES OF CARRYING OUT THE INVENTION

Figure 1:
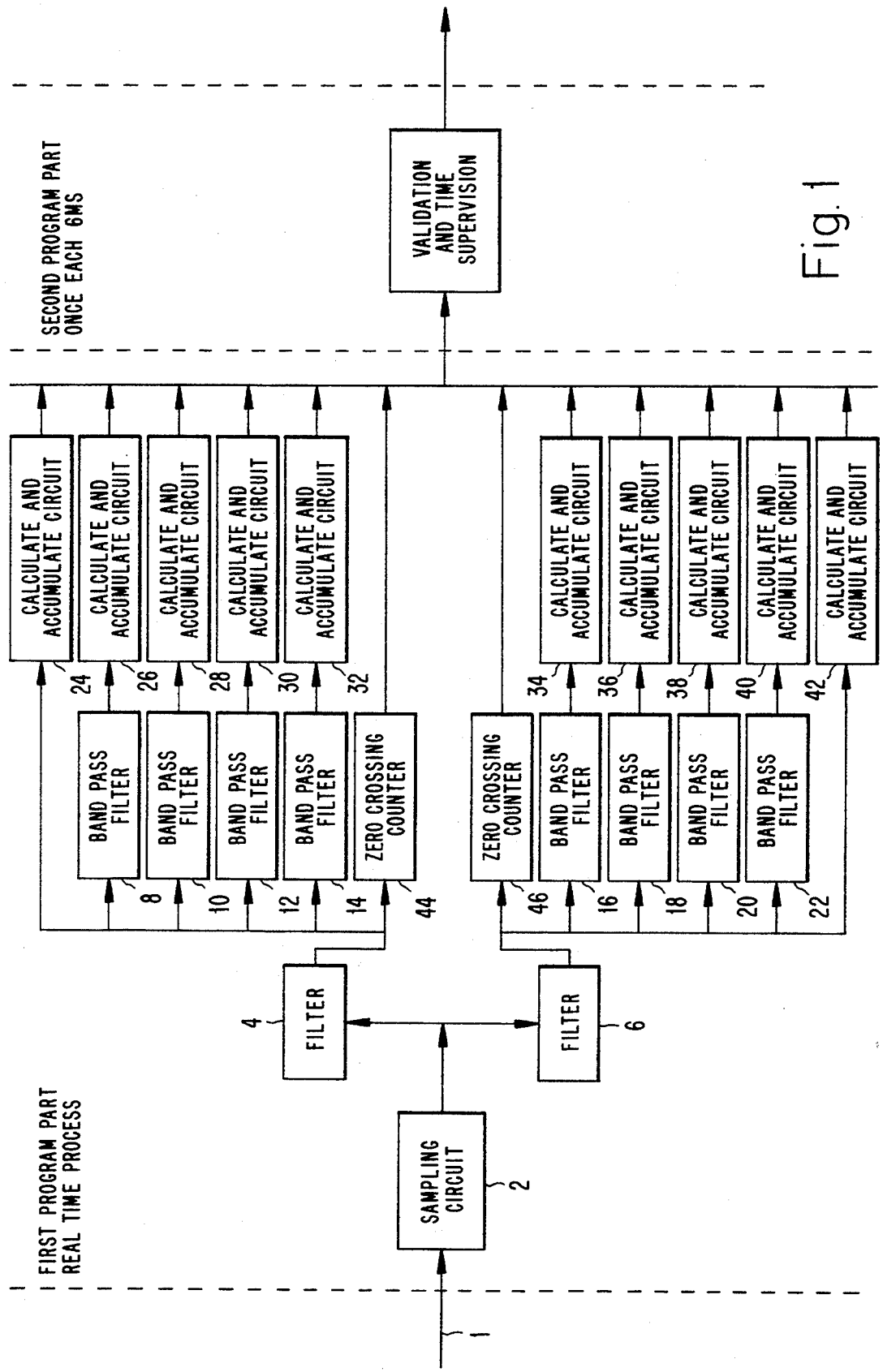
FIG. 1 is a schematic circuit diagram illustrating part of a DTMF-receiver intended for carrying out a program for measuring and investigating an input signal.

FIG. 1 illustrates part of a DTMF-receiver which measures and investigates the receiver input signal. The receiver is assumed to be equipped with a 16-bit digital signal processor.

An input sample of 8-bit PCM having a sampling frequency of 8 kHz is applied first at 1 to a circuit 2 which effects sub-sampling to 4 kHz and thereon linearization to 13 or 14 bits in accordance with an A-law or $\mu$-law. Sub-sampling to 4 kHz means that only each alternate sample is processed and is practical because a digital receiver (or filter) which processes sub-sampled samples has twice the time for real time processing than a digital receiver which processes samples at normal sampling frequencies. Furthermore, sub-sampling can improve the speech immunity of the receiver (A. Zoicas, "DTMF needs no extras", 8 Communications International/Apr. 1990).

After circuit 2, the input signal is divided into a high frequency band and a low frequency band by means of a filter 4 for the high frequency group and a filter 6 for the low frequency group. The output from each of the filters 4 and 6 respectively is delivered to four band-pass filters 8, 10, 12, 14 and 16, 18, 20, 22 respectively. The central frequencies of the filters 8–22 correspond to the DTMF-frequencies in respective bands.

Each of the samples obtained from the filters 4, 8, 10, 12, 14 is delivered to a respective circuit 24, 26, 28, 30 and 32 for calculating and accumulating the energy of respective filters. Similarly, the samples obtained from the filters 6, 16, 18, 20, 22 are delivered to respective circuits 34, 36, 38, 40 and 42 for the same purpose.

The spectral energies of the band-pass filters and the DTMF-resonators are accumulated for a given time period. In the case of this embodiment, this time period is assumed to be 6 ms, which corresponds to 24 filtered samples (24×250 $\mu$s).

Each of the output samples from the circuits 4 and 6 is delivered to a respective zero-crossing counter 44 and 46. The counters 44, 46 sense the characters of the output samples. A zero crossing occurs when the character of a current sample and an earlier sample are equal.

The final results of the processing effected by the receiver in accordance with the first program part, i.e., after the end of the 6 ms-interval, are accumulated spectral energies of the high and low frequency groups respectively and eight DTMF-frequencies, and the number of zero-crossings in the two frequency groups. These results are stored in certain memory positions in the digital signal processor.

Figure 2:
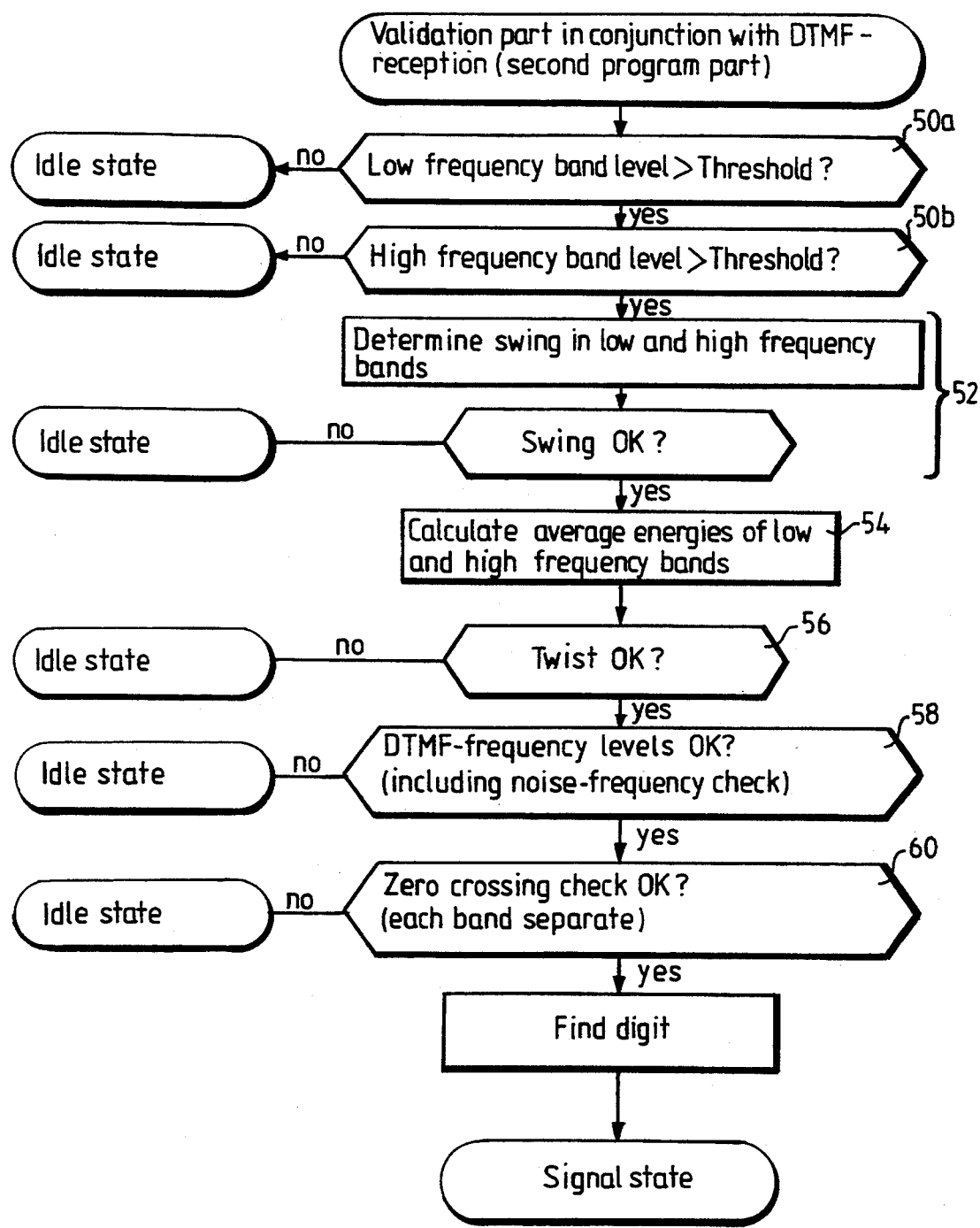
FIG. 2 is a flowchart illustrating a method for evaluating the results of the performance of said program in accordance with the invention.

The second part of the program, or the validation part, is effected by the DTMF-receiver at the end of each 6 ms-interval. This will now be described in more detail with reference to the flowchart of FIG. 2.

A signal level check is carried out at step 50a and 50b. It is necessary that the spectral energies of the low frequency and high frequency bands lie above a given lowest level ("threshold"). If this is not the case, the input signal is not considered to be a DTMF-signal, further validation is interrupted and the receiver passes to an idle state.

A multi-swing check is carried out at step 52 in accordance with the invention. The multi-swing check is carried out in two stages. In the first stage, the swing is determined in both the low frequency band and the high frequency band. As described in the introduction, swing is the difference between the average energy and the current energy of the signal, this latter energy being the energy that has been accumulated during the current 6 ms-interval. In the second stage, a check is made as to whether or not the calculated swing values lie within accepted limits. The multi-swing check is described in more detail below.

The average (reference) energy is calculated at step 54. When the result of the multi-swing check is acceptable, the average energies of both the low and the high frequency bands are again calculated, while taking into account the current energy of the signal. The average energies are calculated at the beginning of the occurrence of a new DTMF-signal.

A twist check is carried out at step 56. This twist check will also be described in more detail below.

Validation of the DTMF-frequencies is effected at step 58 and will be described in more detail below. In brief, validation of the DTMF-frequencies includes establishing the strongest DTMF-frequency in each band, calculating the relationship between the level of the strongest DTMF-frequency in the band and the level of each alternate frequency in the same band, and checking whether or not the calculated relationships, or ratios, lie within the permitted values (including "noise-frequency-tolerance" in accordance with the following). In order for a DTMF-signal to be considered to exist, it is necessary, in general, for the strongest DTMF-frequency in each band to lie above a given threshold, while all other frequencies must lie beneath a given lower threshold. This principle can be modified by the "noise-frequency-tolerance" described below.

A check of zero-crossings separate for low and high frequency bands takes place at step 60, as described in more detail below. The number of zero-crossings can be compared not solely for two mutually sequential 6 ms-intervals (the current and earlier 6 ms-intervals), but also during three or more mutually sequential 6 ms-intervals. Actually, a comparison of three mutually sequential intervals will provide improved speech immunity.

Finally, digit decoding takes place at step 62. The DTMF-number digit be easily re-found when the strongest DTMF-frequency in each band is known. The strongest DTMF-frequency of each band is encountered during step 52.

If all checks are positive, the receiver passes to a state of readiness for receiving a signal, otherwise the receiver passes to an idle state. In both states, the receiver checks time parameters of the temporary signal state/idle state and ensures that a new DTMF-digit will only be detected when all given time requirements (signal/pause duration, signal interruption, etc.) are fulfilled. Each detected digit forms the output to external apparatus, normally a host processor.

According to the first aspect of the invention, the zero crossing count is used to improve the speech immunity of a DTMF-receiver. During the first part of the DTMF-program, zero-crossings are counted separately for the low and the high frequency groups. During the second part of the program, the number of zero-crossings in current and preceding 6 ms measuring intervals are compared in step 60. If the difference is greater than one (1), the input signal is considered not to be DTMF.

According to measurements with a test device of the MITEL type, "DTMF Receiver Test Cassette", a zero crossing check of the aforesaid kind resulted in an increase in the speech immunity of the receiver by more than 25%, while the sensitivity remained the same.

According to another aspect of the invention, a multi-swing check is used in step 52 in order to improve the performance of the receiver in the presence of strong noise and/or interference frequencies in a band.

Normally, a swing check is based on a comparison between average energy, calculated in accordance with the afore-going, and the measured current energy (amplitude) of the input signal, also measured in accordance with the afore-going.

During the second part of the DTMF-program, the program (the algorithm) compares the current energies of, for instance, the low frequency and the high frequency groups and compares these energies with the average energies of corresponding groups. If the differences between current energies and average energies lie beneath given thresholds, the program functions to recalculate the average energies while taking into account current energies, and continues with the signal validation. If the swing then lies above the threshold value, the program draws the conclusion that the input signal is either speech or noise and stops further evaluation.

As before mentioned, the drawback with this standard type of swing checks is that the DTMF-input signal can have a considerable swing in the presence of strong noise and/or interfering or disturbing frequencies. If such is the case, the DTMF-signal will be considered as speech or noise and will of course not be detected. On the other hand, if a greater swing is tolerated, the speech immunity will be considerably reduced.

Figure 3:
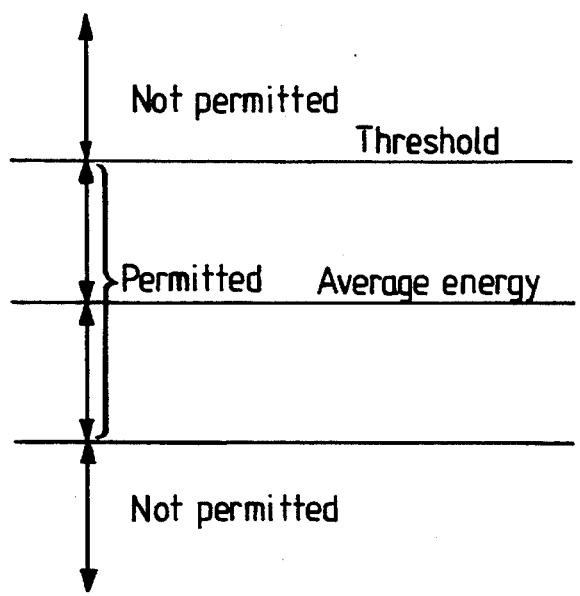
FIG. 3 is a schematic diagram which illustrates a so-called swing check in accordance with the standpoint of techniques.
Figure 4:
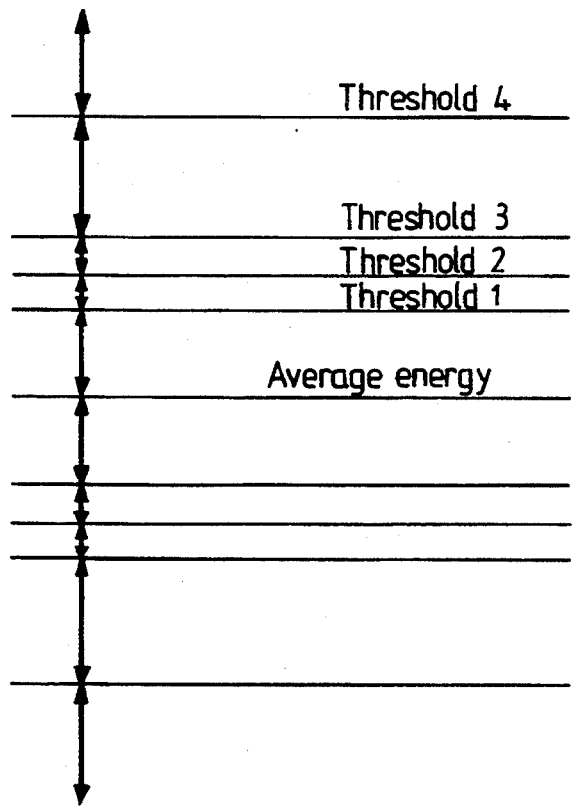
FIG. 4 is a similar diagram illustrating swing check according to the invention.

The difference between a standard swing check and a multi-swing check effected in accordance with the invention is illustrated by comparing FIGS. 3 and 4.

FIG. 3 illustrates the procedure that takes place with a standard swing check. When the energy of the input signal lies above the upper threshold or beneath the lower threshold, the input signal is considered to be speech or noise. The upper and the lower thresholds have dynamic values, i.e., their values are not constant but depend on the average energy of the input signal.

The inventive multi-swing check differs from the standard swing check in that at least three thresholds are used. Two possible threshold arrangements are illustrated in FIG. 4, as described in more detail below. The number of thresholds and their relative values may be different. However, the arrangements shown in FIG. 4 can be considered to provide a good balance between complexity and performance.

The introduction of the inventive multi-swing check is based on the realization that noise or interference frequencies can occur in only one of the low frequency and high frequency group bands at one and the same time. Thus, in accordance with the present invention, it is possible to improve receiver sensitivity by tolerating a greater swing than normal solely in this one band, and correspondingly to tolerate a smaller swing in the other band, in order to maintain an acceptable level of speech immunity. This implies the introduction of at least two further thresholds, compared with the case illustrated in FIG. 3. In addition to a normal threshold 2, the first of the aforesaid arrangements also includes a threshold 3 for swings that are greater than normal, and a threshold 1 for swings that are smaller than normal.

In the case of one embodiment, swing checks with three thresholds, or six thresholds when the thresholds do not lie symmetrically around the average energy, could be carried out in accordance with the following.

First, a check is made with the normal threshold in both bands. If the swing in a band is found to be greater than what is normally allowed, the swing in this band is again checked with the threshold for a greater swing than normal. If this threshold is exceeded, a check is made in the other band with the threshold for a smaller swing than normal. If the swing in this band is found to lie beneath this threshold, the current input signal is a DTMF-signal, otherwise not.

The second arrangement, illustrated in FIG. 4, differs from the first arrangement in the same Figure in that the arrangement includes a further threshold 4 for greater swings than normal. The input signal is considered to be a DTMF-signal when one of the following conditions is fulfilled in the multi-swing check.

(a) The current energy of both bands is beneath the threshold 1 and/or 2.

(b) The current energy of a band exceeds the threshold 2 but not the threshold 3, and the current energy of the other band lies beneath the threshold 1 and/or 2.

(c) The current energy of a band exceeds the threshold 3 but not the threshold 4, the current energy of the other band lies beneath the threshold 1, and no previous energy of the other band, beginning from the 6 ms-interval, in which the current DTMF-signal is detected for the first time, has exceeded the threshold 3.

Measurements made in practice have shown that an inventive multi-swing check carried out with both three and four thresholds will increase the sensitivity of the receiver when noise and/or interferences are found in solely one band, without appreciably impairing speech immunity. When testing a DTMF-receiver, it was found that four thresholds will produce a slightly better result than three thresholds. Different threshold arrangements, however, are conceivable for different cases, and it is not certain that one arrangement will be optimal in all instances.

It should be added that in the case of speech, the swing in both bands is normally too large at the same time.

The third aspect of the invention relates to the case when a constant interference tone occurs in the DTMF-reception.

When decoding a DTMF-signal, it is necessary to find a strongest signal in each of the two frequency groups. When the strongest signal has been found, this signal is compared in each group with the amplitudes of the remaining tones in said group. Many different proposals, although similar proposals, have been put forward as to how this comparison shall be carried out. Normally, it is necessary for the strongest tone to differ from the other tones in its group by a given ratio, and at the same time it must lie above a given threshold. The smaller the permitted threshold ratio between the strongest tone and the other tones in the group, the poorer the speech immunity.

An interference tone of constant frequency can sometimes appear in the speech channel. In this case, the ratio between the strongest tone and that tone in the group which lies nearest the interference tone, will lie beneath the threshold ratio. Consequently, a reduction in the threshold ratio will not afford a solution, since the speech immunity will be worsened.

However, the present invention enables a noise tone to be tolerated, or permits the ratio between the strongest tone and each other tone in the group to lie beneath the threshold value. If this constituted the only limitation, however, it would mean that different noise tones could be tolerated within different 6 ms-intervals. This would cause the speech immunity to fall by more than 100%.

This problem is solved by the fact that only one and the same noise frequency can be tolerated in the stage referenced 58. When a noise frequency occurs for the first time in a current DTMF-signal, this occurrence is noted by the program. If the noise frequency reappears during one of the following 6 ms-intervals of the same DTMF-signal, the noise frequency must concern the noise frequency that was previously discovered. The noise tone ratio must always lie at least 3 dB beneath the strongest tone in the group.

The use of this technique will improve receiver sensitivity in the case of one single interference tone of constant frequency (±30 Hz).

I claim:

1. A method of improving the sensitivity and speech immunity of a receiver in conjunction with DTMF-reception, comprising the steps of:

measuring in real time in a low frequency group band and a high frequency group band during each of a number of measuring intervals an energy parameter which is representative of the tone energy of an input signal;

determining the average value of said measuring parameters over the measuring intervals from the beginning of the signal concerned during the end of each measuring interval;

determining the difference between each of the relevant energy parameters in the two bands and the average value established parameter;

determining at least three threshold values for said difference, wherein said three threshold values are a normal value beneath which a DTMF-signal is considered to exist, at least one greater-than-normal value, and at least one smaller-than-normal value;

determining whether the difference in one of the bands lies above the normal value;

determining whether the difference in questions also lies above the greater-than-normal value when it is determined that the difference lies above the normal value; and comparing the difference in the second band with the smaller-than-normal value in order to establish whether the difference lies beneath said value, which indicates that a DTMF-signal exists.

2. A method according to claim 1, wherein two greater-than-normal values are used, and a DTMF-signal is considered to exist when one of the following conditions is fulfilled, (a) the current energy of the two bands lies beneath the smaller-than-normal value or the normal value;

(b) the current energy of a band exceeds the normal value but not the lower of the greater-then-normal values, and the current energy of the other band is lower than the smaller-than-normal value or the normal value; and (c) the current energy of a band exceeds the lower but not the higher of the greater-than-normal values, the current energy of the other band is lower than the smaller-than-normal value and earlier energy of said other band has not exceeded the lower greater-than-normal value, said earlier energy being counted from the 6 ms interval in which the DTMF-signal concerned is detected for the first time.

3. A method of improving the sensitivity and speech immunity of a receiver in conjunction with DTMF-reception, comprising the steps of:

determining the first occurrence of an interference frequency during one of a plurality of measuring intervals when decoding a DTMF-signal; and tolerating this interference frequency when the same interference frequency is encountered in a following measuring interval.

4. A method for improving the sensitivity and speech immunity of a receiver in conjunction with DTMF-reception according to claim 3, further comprising the steps of:

counting during each of a number of measuring intervals, said measuring intervals lasting at least a plurality of wavelengths of an input signal, in real time the number of zero-crossings of the input signal at frequencies which occur in a low frequency group and a high frequency group of a DTMF-signal;

comparing at the end of each of the measuring intervals the number of zero-crossings for each frequency group in a current measuring interval with the number of zero-crossings in a number of immediately preceding measuring intervals, and establishing the magnitude of any difference therebetween; and treating the input signal as a DTMF-signal when the difference is at most equal to a permitted limit value.

5. A method according to claim 4, wherein the limit value is 1.

6. A method according to claim 4, wherein said comparison of said number of zero-crossings is carried out during at least two mutually sequential measuring intervals.

* * * * *